United States Patent
Koo et al.

(10) Patent No.: US 9,738,557 B2
(45) Date of Patent: Aug. 22, 2017

(54) APPARATUS FOR MANUFACTURING FRONT GLASS FOR DISPLAY OF ELECTRONIC DEVICE

(71) Applicant: 61C&S Co., Ltd., Seoul (KR)

(72) Inventors: Ja-Ock Koo, Yongin-si (KR); Kue Jung Choi, Anseong-si (KR)

(73) Assignee: 61C&S Co., Ltd., Seoul (KR)

( * ) Notice: Subject to any disclaimer, the term of this patent is extended or adjusted under 35 U.S.C. 154(b) by 0 days.

(21) Appl. No.: 14/959,349

(22) Filed: Dec. 4, 2015

(65) Prior Publication Data

US 2017/0158546 A1 Jun. 8, 2017

(51) Int. Cl.
| | |
|---|---|
| C03B 23/023 | (2006.01) |
| F27B 9/04 | (2006.01) |
| F27B 9/24 | (2006.01) |
| F27B 9/30 | (2006.01) |
| C03B 23/03 | (2006.01) |

(52) U.S. Cl.
CPC ...... C03B 23/0235 (2013.01); C03B 23/0302 (2013.01)

(58) Field of Classification Search
CPC .............. C03B 23/0235; F27B 9/243; F27B 9/045–9/047; F27B 9/3005; F27B 2009/124; F27B 9/082–9/088; F27B 3/12; F27B 2009/3072; F27B 13/00; F27D 7/02; F27D 7/06; F27D 2009/0013; F27D 2001/0059; F27D 2001/0066; F27D 2001/0086

See application file for complete search history.

(56) References Cited

U.S. PATENT DOCUMENTS

| | | | | |
|---|---|---|---|---|
| 3,422,205 | A | * 1/1969 | Pisano | C21D 1/40 373/137 |
| 4,416,623 | A | * 11/1983 | Takahashi | F27B 9/40 219/390 |
| 6,048,199 | A | * 4/2000 | Dull | F27B 9/3005 264/652 |

\* cited by examiner

Primary Examiner — Erin Snelting
(74) Attorney, Agent, or Firm — Hauptman Ham, LLP

(57) ABSTRACT

An apparatus for manufacturing front glass for an electronic device produced between an upper mold and a lower mold and having an at least partially curved surface, the apparatus including an inner tube 10 of a specific length and having an entrance portion for allowing the mold assembly for heat treatment to enter the inner tube and an exit portion for allowing the mold assembly after the heat treatment to exit; a conveyer belt for feeding a plurality of mold assemblies thereon, at specific speed in such a way as to pass through the inner tube; and a high temperature chamber 20 surrounding the inner tube between the entrance portion and exit portion of the inner tube and having a heat source for forming a high temperature atmosphere in order to form the front glass fed within the inner tube.

5 Claims, 2 Drawing Sheets

APPARATUS FOR MANUFACTURING FRONT GLASS FOR DISPLAY OF ELECTRONIC DEVICE

FIELD OF THE INVENTION

The present invention relates to an apparatus for manufacturing front glass installed in the front surface of a portable terminal or a display and, more particularly, to an apparatus for manufacturing front glass, which can maintain uniform high quality of 3D glass while efficiently preventing oxidization in the inside having a high temperature atmosphere and can be advantageously applied to mass production.

BACKGROUND OF THE INVENTION

Glass is installed in the front surface of a display device, such as an LCD or an LED, in portable terminals including smart phones which recently come into use. Furthermore, a specific function is designed to be executed by touching front glass because a touch pad function is included in such a display device. Furthermore, such front glass is also widely applied to home appliances, such as TV, and an electronic device for vehicle, such as a navigator, in addition to a smart phone and a personal terminal, such as a touch pad having a specific function. Furthermore, in the case of a smart phone having a touch pad function, such front glass is also called touch window glass.

Such front glass is applied to products as 2D glass commonly having a plane shape. Recently, the front glass of TV, that is, one of home appliances, is generally formed into a curved surface or into a curved surface having curves on both sides thereof on the basis of a single axis. The glass of a smart phone is also formed of curved surface glass having various types. Furthermore, glass formed to have a curved surface as described above in a smart phone is commonly called 3D glass.

Furthermore, for example, the 3D glass of a smart phone may be formed into a curved surface with respect to any one of an X axis and a Y axis on the XY plane. Furthermore, although the 3D glass is formed to have a curved surface with respect to a single axis as described above, front glass may be generally formed into a curved surface or edges on both sides may be formed into a curved surface. Furthermore, the 3D glass may be formed into a curved surface with respect to the X axis and the Y axis, that is, the two axes. Alternatively, the central part of the 3D glass may be formed to have a plane, and only the edge part thereof may be formed to have a curved surface. Furthermore, the entire 3D glass may be formed into a curved surface.

As shown in FIG. 1, 3D glass having a curved surface as described above is commonly formed by an upper mold Da and a lower mold Db. That is, the shape of the 3D glass is determined by the shape of a cavity formed between the upper mold Da and the lower mold Db. If such an upper mold and a lower mold are placed in a high temperature atmosphere, 3D glass Gb corresponding to the cavity between the upper mold Da and the lower mold Db is produced from a plane shaped glass Ga.

Regarding the forming of the curved surface of front glass which may be used for a portable terminal or home appliances, some mold were suggested by Japanese Patent Application Publication No. 2007-534596. However, the Japanese prior art did not mention any apparatus capable of mass production. Furthermore, Korean Patent No. 10-1449364 issued to the present applicant discloses a forming apparatus using an endless conveyer for mass production. However, the forming apparatus does not disclose an element for preventing oxidization during mass production or an element for enabling the forming apparatus to reliably operate for a long term with respect to a change attributable to thermal expansion and thermal contraction.

SUMMARY OF THE INVENTION

An object of the present invention is to provide a manufacturing apparatus capable of manufacturing front glass at least partially having a curved surface while maintaining high quality through mass production.

Another object of the present invention is to provide a manufacturing apparatus, which enables parts for fabrication to be used for a long term by suppressing oxidization attributable to oxygen in a high temperature atmosphere to a maximum extent within the forming apparatus for manufacturing front glass at least partially having a curved surface.

An apparatus for manufacturing front glass at least partially having a curved surface operates in a high temperature atmosphere for at least the plastic deformation of glass. Yet another object of the present invention is to provide a manufacturing apparatus capable of having sufficient reliability even in use for a long term by sufficiently absorbing thermal expansion and contraction attributable to such a high temperature.

In accordance with an aspect of the present invention, there is provided an apparatus for manufacturing front glass for the display of an electronic device, the front glass being formed by a mold assembly including an upper mold and a lower mold and having at least partially a curved surface shape. The apparatus includes an inner tube of a specific length and having an entrance portion for allowing the mold assembly for heat treatment to enter the inner tube and an exit portion for allowing the mold assembly after the heat treatment to exit; a conveyer belt for feeding a plurality of mold assemblies thereon, at specific speed in such a way as to pass through the inner tube; a high temperature chamber surrounding the inner tube between the entrance portion and exit portion of the inner tube and having a heat source for forming a high temperature atmosphere in order to form the front glass fed within the inner tube; a plurality of nitrogen supply ports installed in the entrance portion and exit portion of the inner tube, respectively, for supplying nitrogen continuously to the inner tube when the apparatus operates; and an emergency nitrogen supply port installed at least on one side of the entrance portion and the exit portion close to the high temperature chamber, for supplying nitrogen to the inner tube when density of oxygen within the inner tube is higher than a reference value.

Furthermore, the apparatus may further include cooling means installed in the exit portion of the inner tube, for cooling the mold assembly after the heat treatment. In this case, the cooling means accordance to an embodiment includes a cooling jacket surrounding the exit portion of the inner tube and having an entrance for allowing water to be received therein and an exit for allowing water circulating through the inside of the inner tube to be discharged therefrom.

In accordance with another embodiment of the present invention, the apparatus further includes a frame for supporting the inner tube and the high temperature chamber from a ground at a predetermined height and a support bar installed in the frame, for supporting a bottom surface of the inner tube which is thermally expanded in a length direction due to heat from the high temperature chamber, and installed at least on one side of the entrance portion and exit portion of the inner tube. In this case, the support bar may be supported through bearings with respect to the frame and comes into rolling contact with the bottom surface of the inner tube outward moved by thermal expansion.

In accordance with another aspect of the present invention, there is provided an apparatus for manufacturing front glass for the display of an electronic device. The front glass is formed by a mold assembly including an upper mold and a lower mold and having at least partially a curved surface shape. The apparatus includes an inner tube of a specific length and having an entrance portion for allowing the mold assembly for heat treatment to enter the inner tube and an exit portion for allowing the mold assembly after the heat treatment to exit; a conveyer belt for feeding a plurality of mold assemblies thereon, at specific speed in such a way as to pass through the inner tube; a high temperature chamber surrounding the inner tube between the entrance portion and exit portion of the inner tube and having a heat source for forming a high temperature atmosphere in order to form the front glass fed within the inner tube; a frame for supporting the inner tube and the high temperature chamber from a ground at a predetermined height; and a support bar installed in the frame, for supporting a bottom surface of the inner tube which is thermally expanded in a length direction due to heat from the high temperature chamber, and installed at least on one side of the entrance portion and exit portion of the inner tube.

Even in such an embodiment, the support bar may be supported through bearings with respect to the frame and comes into rolling contact with the bottom surface of the inner tube outward moved by thermal expansion.

In accordance with yet another embodiment of the present invention, there is provided an apparatus for manufacturing front glass for the display of an electronic device. The front glass is formed by a mold assembly including an upper mold and a lower mold and having at least partially a curved surface shape. The apparatus includes an inner tube of a specific length and having an entrance portion for allowing the mold assembly for heat treatment to enter the inner tube and an exit portion for allowing the mold assembly after the heat treatment to exit; a conveyer belt for feeding a plurality of mold assemblies thereon, at specific speed in such a way as to pass through the inner tube; a high temperature chamber surrounding the inner tube between the entrance portion and exit portion of the inner tube and having a heat source for forming a high temperature atmosphere in order to form the front glass fed within the inner tube; and cooling means installed in the exit portion of the inner tube, for cooling the mold assembly fed within the inner tube.

In such an embodiment, the cooling means includes a cooling jacket surrounding the exit portion of the inner tube and having an entrance for allowing water to be received therein and an exit for allowing water circulating through the inside of the inner tube to be discharged therefrom.

DETAILED DESCRIPTION OF THE INVENTION

Figure 2:
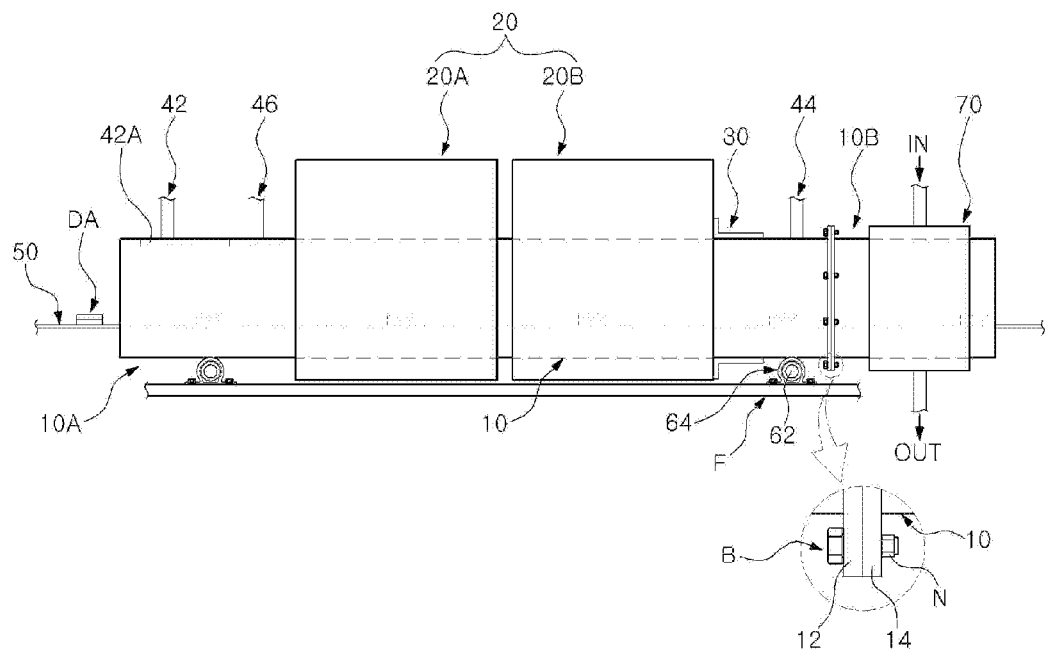
FIG. 2 is a schematic exemplary diagram of an apparatus for manufacturing front glass according to the embodiment of the present embodiment.

Hereinafter, exemplary embodiments of the present invention are described in detail with reference to the accompanying drawings. As shown in FIG. 2, an apparatus for manufacturing front glass according to an embodiment of the present embodiment includes a conveyer belt 50 for feeding a mold for forming 3D glass and an inner tube 10 of a tube form for allowing the conveyer belt 50 to pass through the inner tube.

Figure 1:
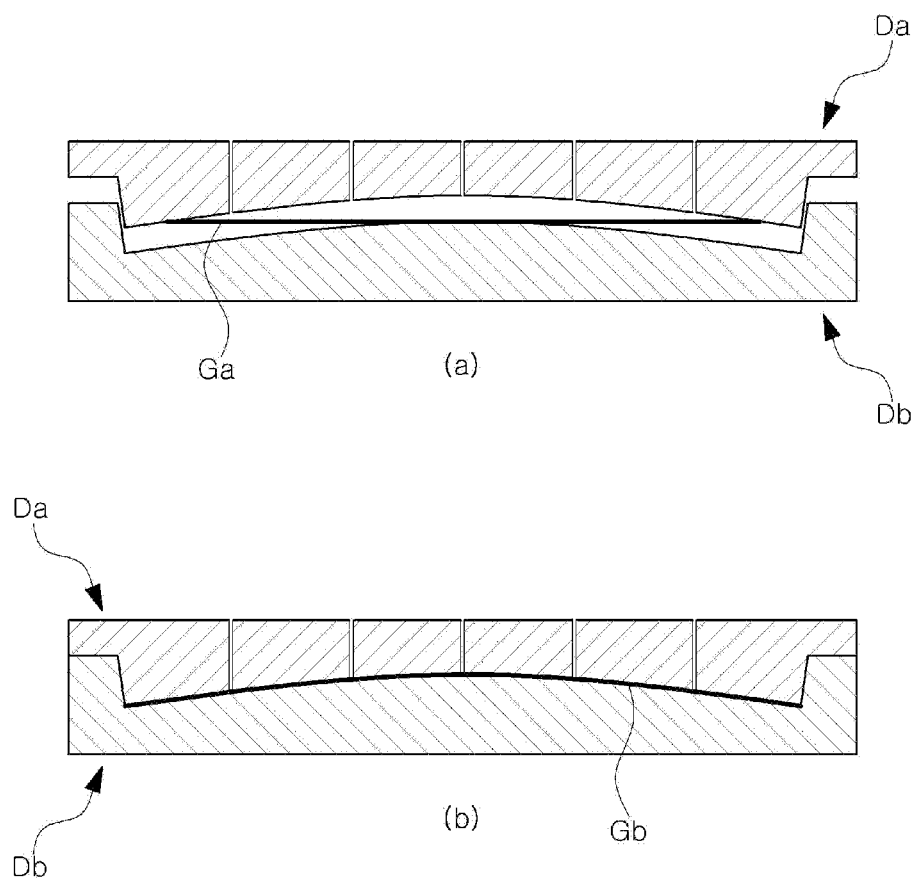
FIG. 1 is an exemplary diagram of mold assemblies Da and Db for forming front glass having a curved surface.

The conveyer belt 50 is made of a metal material because it has to experience a high temperature atmosphere. The conveyer belt 50 moves at set speed in the state in which a plurality of molds (e.g., molds, such as those shown in FIG. 1) has been placed on the conveyer belt 50 and is substantially implemented in an endless form. Furthermore, the conveyer belt 50 and a driving apparatus for driving the conveyer belt 50 are substantially widely used, and a detailed description of them is omitted.

The inner tube 10 through which the conveyer belt 50 passes has a sufficient length as shown in FIG. 2. A mold placed on the conveyer belt 50 is heated and deformed while passing through the inner tube 10, thereby forming curved surface glass at least partially having a curved surface. A high temperature atmosphere is required to process glass on a flat sheet into curved surface glass as described above. Accordingly, a high temperature chamber 20 including a heating source is installed to surround the inner tube 10.

The inside of the chamber 20 may become a high temperature by heat generated by the heating source (i.e., heater 120) installed in the chamber 20. The inside of the inner tube 10 also becomes a high temperature. Furthermore, a mold for forming 3D glass substantially passes through the inner tube 10 even within the high temperature chamber 20. Since the chamber 20 is installed outside the inner tube 10, a temperature can be controlled more accurately and a set temperature can be advantageously maintained against an external environment.

Accordingly, a temperature can be accurately controlled and a set temperature can be maintained more easily because 3D glass is processed in a high temperature atmosphere within the inner tube 10 in the high temperature chamber 20. Furthermore, it may be more advantageous in terms of the prevention of oxidization attributable to the introduction of oxygen because the internal space of the inner tube 10 is relatively smaller than the high temperature chamber 20. If 3D glass is formed within the inner tube 10 in the high temperature chamber 20 as described above, there is a sufficient advantage in substantially maintaining high quality of a finished product.

Furthermore, the conveyer belt 50 having a predetermined width is rotated according to a predetermined route within the inner tube 10, and the high temperature chamber 20 is installed in such a way as to surround the inner tube 10. When the feeding of a mold by the conveyer belt 50 is taken into consideration, the inner tube 10 may have a rectangular pipe form. The high temperature chamber 20 installed to surround the inner tube 10 may also be formed of a rectangular pipe.

In the illustrated embodiment, it may be seen that the high temperature chamber 20 includes a pre-heating chamber 20A and a heating chamber 20B. The pre-heating chamber 20A and the heating chamber 20B may be elements for pre-heating a mold assembly DA introduced in a room temperature state to a specific temperature and then heating the mold assembly DA to a temperature at which the mold assembly DA may be sufficiently subjected to plastic deformation. Furthermore, an insulating layer for the outside may be provided within the high temperature chamber 20.

Elements for supplying nitrogen to the inner tube 10 are described below. A high temperature atmosphere, such as that described above, is generated within the inner tube 10. If the concentration of oxygen is high in such a high temperature atmosphere, the oxidization of an exposed part is accelerated. Accordingly, nitrogen supply ports 42 and 44 for preventing external oxygen that penetrates the inner tube 10 when nitrogen is supplied to the inner tube 10 from becoming a specific concentration or higher are provided in the entrance portion 10A and exit portion 10B of the inner tube 10.

As described above, the nitrogen supply ports 42 and 44 are installed in the entrance portion 10A and the exit portion 10B in order to prevent the excessive introduction of external oxygen. Accordingly, the oxidization of parts within the inner tube 10, for example, the mold assemblies DA and DA can be suppressed within a permissible range or can be prevented. In general, a mold for forming such front glass is made of graphite which may be said to be the most advantageous material from a viewpoint of thermal deformation and thermal contraction. The graphite is disadvantageous in that it is easily oxidized when it is exposed to oxygen in a high temperature atmosphere.

Accordingly, in an embodiment of the present invention, the nitrogen supply ports 42 and 44 are respectively installed in the entrance portion 10A and the exit portion 10B that belong to the inner tube 10 and that have a possibility that external air may be introduced. Furthermore, for example, the nitrogen supply port 42 installed in the entrance portion 10A supplies nitrogen to an internal nitrogen tube 42A installed in the length direction within the inner tube 10. In this case, if the internal nitrogen tube 42A is installed in the length direction and a plurality of spray holes is formed in the internal nitrogen tube 42A, the penetration of external air can be substantially prevented.

Furthermore, the plurality of spray holes is formed in the internal nitrogen tube 42A installed at the upper part of the inner tube 10. Accordingly, nitrogen is sprayed through the plurality of spray holes. Furthermore, a configuration including the nitrogen supply port 42 and the internal nitrogen tube 42A in which the plurality of spray holes has been formed may be identically applied to other nitrogen supply ports 44 and 46.

In addition to the nitrogen supply ports 42 and 44 installed in the entrance portion 10A and the exit portion 10B, an emergency nitrogen supply port 46 is installed in a portion of the inner tube 10 close to the high temperature chamber 20. If density of oxygen within the inner tube corresponding to the inside of the high temperature chamber 20 rises to a permissible reference or higher, the emergency nitrogen supply port 46 temporarily supplies nitrogen to the inner tube 10 in order to reduce the oxygen concentration. Furthermore, the same structure as the structure of the nitrogen supply port 42 installed in the entrance portion may be supplied to the supply of nitrogen through the emergency nitrogen supply port 46.

The thermal deformation of the inner tube is described below. The entrance portion 10A and the exit portion 10B need to be provided on both sides of the high temperature chamber 20 so that they are sufficiently exposed because the inner tube 10 has a sufficient length. Furthermore, when a portion in which the high temperature chamber 20 is installed is taken into consideration, the inner tube 10 has a significant length. As may be seen from the enlarged view portion of FIG. 2, the inner tube 10 is formed by connecting several rectangular pipes. Flanges 12 and 14 are formed at the front and rear ends of the respective rectangular pipes and are connected by a bolt B and a nut N, thereby producing the inner tube 10 having a required length.

Furthermore, the inner tube 10 needs to heat the mold assemblies DA and DA, moving along the conveyer belt 50, at a high temperature via the inside of the high temperature chamber 20. As a result, the inner tube 10 is inevitably heated to a high temperature. If the inner tube 10 is heated to a high temperature as described above, it is substantially thermally deformed. Although a detailed element is not shown in FIG. 2, the high temperature chamber 20 is supported by the frame F at a predetermined height from the ground. For reference, FIG. 2 illustrates that a frame F supports part of the inner tube which expands due to thermal deformation.

That is, the high temperature chamber 20 is supported by the frame F in a fixed state. The inner tube 10 within the high temperature chamber 20 is supported within the high temperature chamber 20, but is inevitably expanded or contracted by heat in the length direction thereof. Accordingly, when the inner tube 10 is thermally expanded and contracted, it needs to be smoothly supported when the inner tube moves in the length direction which may be said to be the left and right direction in the drawing.

FIG. 2 shows part of the frame F supporting the inner tube 10. As shown in FIG. 2, the inner tube 10 is supported by support bars 62 installed at a right angle to the length direction of the inner tube. In this case, the support bars 62 are installed in the horizontal direction that is a right angle to the length direction of the inner tube 10 in the frame F. The support bars 62 are supported so that they are smoothly rotated by bearings 64. For example, when the inner tube 10 is expanded by heat, the exit portion 10B of the inner tube 10 moves to the right on the basis of FIG. 2, for example.

In this case, the exit portion 10B of the inner tube 10 may move to the right very smoothly because it has been placed on the support bars 62 rotatably supported by the bearings 64. In this case, the support bars 62 are also rotated by the thermal expansion of the exit portion 10B of the inner tube 10. Furthermore, after the use of the manufacturing apparatus is completed, the inner tube 10 is contracted while the manufacturing apparatus is not used. In such a case, the exit portion 10B of the inner tube 10 moves to the right, and the support bars 62 may rotate counterclockwise in response to such a movement.

As may be seen from the description, when the inner tube 10 moves in the length direction by thermal expansion or thermal contraction, the inner tube 10 substantially comes into a rolling contact with the support bars 62. Furthermore, as in the illustrated embodiment, the support bars 62 may be installed in both the exit portion 10B and entrance portion 10A of the inner tube 10.

Furthermore, in the illustrated embodiment, the inner tube 10 has been illustrated as being installed in a linear form, but the present invention is not limited thereto. For example, the inner tube 10 may be configured so that the entrance portion 10A and the exit portion 10B have a slope. More specifically, for example, the entrance portion 10A may have a slope that becomes higher toward the high temperature chamber 20, and the exit portion 10B may be downward inclined from the high temperature chamber 20. If the entrance portion 10A and the exit portion 10B have a slope as described above, external air can be prevented from entering the inner tube more certainly by nitrogen supplied by the nitrogen supply ports 42 and 44 installed in the entrance portion 10A and the exit portion 10B.

A guide tube 30 is installed at the end of the high temperature chamber 20 that is close to the exit portion 10B of the inner tube 10 and that is placed on the downstream side. The guide tube 30 functions to stably support the inner tube 10 which moves in the axial direction by thermal expansion or thermal contraction as described above. That is, the guide tube 30 is installed in a portion that exits from the high temperature chamber 20. Accordingly, when the inner tube 10 moves left and right, it can be stably supported by the guide tube 30 along with the support bars 62, and the generation of penetrating noise can be suppressed within a possible range.

A cooling apparatus according to an embodiment of the present invention is described below. The mold assembly DA placed on the conveyer belt 50 and sequentially supplied as described above is first pre-heated to a specific temperature in the pre-heating chamber 20A and then formed in earnest in the heating chamber 20B. Furthermore, the mold assembly DA passing through the heating chamber 20B needs to be substantially cooled.

In accordance with the manufacturing apparatus according to an embodiment of the present embodiment, the nitrogen supply port 44 continues to discharge nitrogen to the inner tube 10 because it is installed in the exit portion 10B. Nitrogen supplied from the nitrogen supply port 44 to the inner tube 10 as described above basically functions to prevent oxygen from entering the inner tube 10. In this case, the nitrogen supply port 44 of the exit portion 10B functions to block the penetration of oxygen and also functions to primarily cool the mold assembly DA heated to a very high temperature in the heating chamber 20B.

Nitrogen supplied to the inner tube 10 through the nitrogen supply port 44 has a very low-temperature state compared to the mold assembly DA that exits from the heating chamber 20B. Accordingly, the mold assembly DA heated in a very high temperature state in the heating chamber 20B is primarily cooled by nitrogen that exits from the nitrogen supply port 44 and may be cooled to a lower temperature by secondary cooling using water.

A cooling jacket 70 is installed on the downstream side compared to the nitrogen supply port 44 on the exit side. The cooling jacket 70 is installed to surround the outer circumference surface of the inner tube 10. Accordingly, the inner tube 10 substantially forms the inner circumference surface of the cooling jacket 70. Furthermore, water circulates through the cooling jacket 70. For example, an entrance IN that water supplied by a water pump enters and an exit OUT through which water circulating through the cooling jacket 70 is externally discharged are formed in the cooling jacket 70. Accordingly, a portion of the inner tube 10 in which the cooling jacket 70 has been installed may be cooled to a very low-temperature state compared to the high temperature chamber 20.

Furthermore, if a portion of the inner tube 10 in which the cooling jacket 70 has been installed becomes a very low temperature, the mold assembly DA fed within the portion of the inner tube 10 can be cooled very effectively. As described above, in an embodiment of the present invention, the water cooling method is adopted for more efficient cooling. It may also be seen that primary cooling, that is, a kind of air cooling type, is performed by supplying nitrogen prior to cooling using such a water cooling method.

Figure 3:
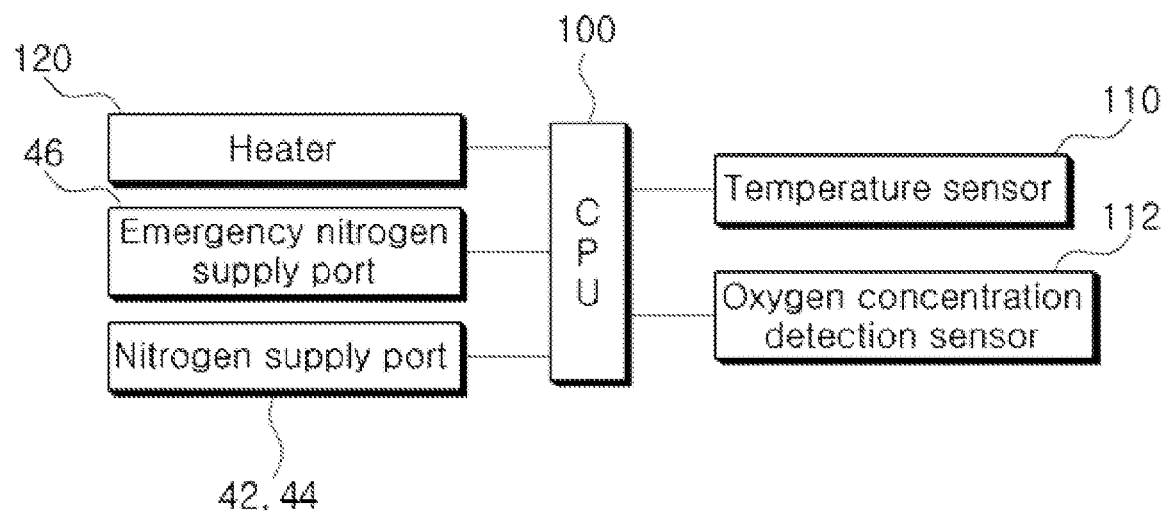
FIG. 3 is a block diagram illustrating control of the manufacturing apparatus according to the embodiment of the present embodiment.

Overall control of the manufacturing apparatus according to an embodiment of the present embodiment is described below with reference to FIG. 3. First, basic control is described below. When the apparatus for manufacturing front glass according to the present embodiment normally operates, a central processing unit (CPU) 100 basically performs control so that a predetermined amount of nitrogen is supplied through the nitrogen supply ports 42 and 44. Furthermore, the CPU 100 controls a temperature sensor 110 installed in the high temperature chamber 20 so that the high temperature chamber 20 is maintained within a predetermined temperature range based on a temperature value detected by the temperature sensor 110. A pair of the temperature sensors 110 may be respectively installed in the pre-heating chamber 20A and the heating chamber 20B. In this case, the CPU 100 may independently control the temperature sensors 110 installed in the pre-heating chamber 20A and the heating chamber 20B.

Furthermore, in accordance with an embodiment of the present invention, density of oxygen detection sensor 112 is installed in the high temperature chamber 20. An oxygen concentration detected by the oxygen concentration detection sensor 112 is transmitted to the CPU 100. Furthermore, the CPU 100 controls the emergency nitrogen supply port 46 based on density of oxygen within the high temperature chamber 20. That is, if density of oxygen within the high temperature chamber 20 is higher than a permission reference value, the CPU 100 controls the emergency nitrogen supply port 46.

That is, if density of oxygen within the high temperature chamber 20 becomes higher than a reference value, there is a good possibility that oxidization may be generated in the high temperature chamber 20. Accordingly, the oxygen concentration needs to be reduced by supplying nitrogen through the emergency nitrogen supply port 46. Furthermore, if density of oxygen within the high temperature chamber 20 is within a permissible range, it needs to be continuously checked. Furthermore, density of oxygen can be rapidly reduced because nitrogen is substantially directly supplied to the inner tube 10.

As described above, in an embodiment of the present invention, the mold assembly DA in which glass to be processed in a high temperature atmosphere has been installed is fed through the conveyer belt 50. In this case, the conveyer belt 50 passes through the inside of the inner tube 10. A required temperature in a high temperature state can be controlled more accurately because the inner tube having an internal volume relatively smaller than that of the high temperature chamber is used as described above. Furthermore, density of oxygen can be rapidly reduced by supplying nitrogen as described above.

In accordance with an embodiment of the present invention, a mold assembly for forming front glass passes through the inside of the inner tube, and the high temperature chamber for generating heat is installed to surround the outside of the inner tube. In accordance with such a configuration, the penetration of oxygen and an alien substance can be efficiently prevented and a required temperature can be controlled more accurately by controlling the inner tube having a relatively small volume.

Furthermore, in accordance with the manufacturing apparatus according to an embodiment of the present embodiment, cooling can be efficiently performed by cooling the inner tube using water because the cooling jacket through which water circulates is installed in the exit portion. In this case, it is expected that the nitrogen supply port installed in the exit portion may perform preliminary cooling prior to cooling using the cooling jacket.

The nitrogen supply port according to an embodiment of the present invention can effectively prevent oxygen which may cause oxidization from entering the inner tube. Furthermore, the emergency nitrogen supply port can rapidly supply nitrogen if density of oxygen within the inner tube becomes higher than a reference value. Accordingly, it is expected that if a conventional nitrogen supply port and the emergency nitrogen supply port are used, the oxidization of an internal part attributable to oxygen can be suppressed to a maximum extent.

Furthermore, the support bars according to an embodiment of the present embodiment are supported by the frame by the bearings. Although the inner tube is axially moved by thermal expansion or contraction, it can be supported more smoothly and strongly. Furthermore, it is expected that disadvantages, such as noise or a scratch, can be sufficiently solved because the inner tube and the support bars comes into a rolling contact with each other.

Furthermore, those skilled in the art will understand that the present invention may be modified in other various ways within the category of the basic technical spirit of the present invention. It is considered that the scope to be protected by the present invention should be substantially interpreted based on the appended claims.

What is claimed is:

1. An apparatus for manufacturing front glass for a display of an electronic device, the front glass being formed by a mold assembly comprising an upper mold and a lower mold and having at least partially a curved surface shape, the apparatus comprising:
  an inner tube of a specific length, the inner tube having an entrance portion for allowing the mold assembly for heat treatment to enter the inner tube and an exit portion for allowing the mold assembly after the heat treatment to exit;
  a conveyer belt for feeding a plurality of mold assemblies thereon, at specific speed, to pass through the inner tube;
  a chamber surrounding the inner tube between the entrance portion and exit portion of the inner tube, and having a heat source for forming a temperature atmosphere for plastic deformation of the front glass fed within the inner tube;
  a plurality of nitrogen supply ports installed in the entrance portion and exit portion of the inner tube, respectively, for supplying nitrogen continuously to the inner tube when the apparatus operates;
  an emergency nitrogen supply port installed at least on one side of the entrance portion and the exit portion close to the chamber, for supplying nitrogen to the inner tube when density of oxygen within the inner tube is higher than a reference value;
  a frame for supporting the inner tube and the chamber from a ground at a predetermined height; and
  a support bar installed in the frame, for supporting a bottom surface of the inner tube which is thermally expanded in a length direction due to heat from the chamber, the support bar installed at least on one side of the entrance portion and exit portion of the inner tube,
  wherein the support bar is supported through bearings with respect to the frame and comes into rolling contact with the bottom surface of the inner tube outward moved by thermal expansion.

2. The apparatus of claim 1, further comprising a cooling jacket installed in the exit portion of the inner tube, for cooling the mold assembly after the heat treatment.

3. The apparatus of claim 2, wherein
  the cooling jacket comprises an entrance through which water is inputted and an exit from which water circulating through the inside of the cooling jacket is discharged, and
  the exit portion of the inner tube is surrounded by the cooling jacket.

4. An apparatus for manufacturing front glass for a display of an electronic device, the front glass being formed by a mold assembly comprising an upper mold and a lower mold and having at least partially a curved surface shape, the apparatus comprising:
  an inner tube of a specific length, the inner tube having an entrance portion for allowing the mold assembly for heat treatment to enter the inner tube and an exit portion for allowing the mold assembly after the heat treatment to exit;
  a conveyer belt for feeding a plurality of mold assemblies thereon, at specific speed in such a way as to pass through the inner tube;
  a chamber surrounding the inner tube between the entrance portion and exit portion of the inner tube, and having a heat source for forming a temperature atmosphere for plastic deformation of the front glass fed within the inner tube;
  a frame for supporting the inner tube and the chamber from a ground at a predetermined height; and
  a support bar installed in the frame, for supporting a bottom surface of the inner tube which is thermally expanded in a length direction due to heat from the chamber, the support bar installed at least on one side of the entrance portion and exit portion of the inner tube,
  wherein the support bar is supported through bearings with respect to the frame and comes into rolling contact with the bottom surface of the inner tube outward moved by thermal expansion.

5. An apparatus for manufacturing front glass for a display of an electronic device, the front glass being formed by a mold assembly comprising an upper mold and a lower mold and having at least partially a curved surface shape, the apparatus comprising:
  an inner tube of a specific length, the inner tube having an entrance portion for allowing the mold assembly for heat treatment to enter the inner tube and an exit portion for allowing the mold assembly after the heat treatment to exit;
  a conveyer belt for feeding a plurality of mold assemblies thereon, at specific speed in such a way as to pass through the inner tube;
  a chamber surrounding the inner tube between the entrance portion and exit portion of the inner tube, and having a heat source for forming a temperature atmosphere for plastic deformation of the front glass fed within the inner tube;
  a cooling jacket installed in the exit portion of the inner tube and configured to cool the mold assembly fed within the inner tube;
  a frame for supporting the inner tube and the chamber from a ground at a predetermined height; and
  a support bar installed in the frame, for supporting a bottom surface of the inner tube which is thermally expanded in a length direction due to heat from the chamber, the support bar installed at least on one side of the entrance portion and exit portion of the inner tube,
wherein
   the cooling jacket comprises an entrance for allowing water to be received therein and an exit for allowing water circulating through the inside of the cooling jacket,
   the exit portion of the inner tube is surrounded by the cooling jacket, and
   the support bar is supported through bearings with respect to the frame and comes into rolling contact with the bottom surface of the inner tube outward moved by thermal expansion.

* * * * *